(12) United States Patent
Brown et al.

(10) Patent No.: US 6,826,276 B2
(45) Date of Patent: Nov. 30, 2004

(54) MANAGING CALLER PROFILES ACROSS MULTIPLE CALL HOLD CENTERS

(75) Inventors: Michael Wayne Brown, Georgetown, TX (US); David R. Cheng, Wilmington, DE (US); Wing-Ying Stephanie Leung, Ann Arbor, MI (US); Folu Okunseinde, Oakhurst, NJ (US); Michael A. Paolini, Austin, TX (US); Seema Sheth-Voss, Cambridge, MA (US); Scott Lee Winters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 340 days.

(21) Appl. No.: 10/005,733

(22) Filed: Dec. 3, 2001

(65) Prior Publication Data

US 2003/0103617 A1 Jun. 5, 2003

(51) Int. Cl.[7] .................................................. H04M 5/00
(52) U.S. Cl. ............................... 379/265.02; 379/265.09
(58) Field of Search .................... 379/265.02, 265.09, 379/265.11, 265.01, 266.1

(56) References Cited

U.S. PATENT DOCUMENTS

| | | | | |
|---|---|---|---|---|
| 4,953,204 A | * | 8/1990 | Cuschleg et al. | 379/266.05 |
| 5,875,231 A | | 2/1999 | Farfan et al. | 379/209.01 |
| 5,946,378 A | * | 8/1999 | Farfan | 379/88.23 |
| 6,028,917 A | * | 2/2000 | Creamer et al. | 379/100.01 |
| 6,522,743 B1 | * | 2/2003 | Hurd | 379/266.04 |
| 6,639,982 B1 | * | 10/2003 | Stuart et al. | 379/266.03 |

\* cited by examiner

Primary Examiner—Ahmad F. Matar
Assistant Examiner—Quynh H. Nguyen
(74) Attorney, Agent, or Firm—Mark S. Walker; Amy J. Pattillo

(57) ABSTRACT

A method, system, and program for managing a caller profile for multiple callers across multiple call hold centers are provided. Multiple call centers preferably subscribe to a remote caller profile server that manages caller profiles that are distributable to the multiple call centers. Each of the multiple call centers utilizes caller profiles to specify services to the callers related to the caller profiles when callers are placed on hold within the caller centers. In addition, each of the call centers monitors the activity of callers while on hold and transfers the monitored activity information to the remote caller profile server to update the caller profiles.

40 Claims, 6 Drawing Sheets

```
                    CALLER PROFILE                    ┐─50
                    CALLER 5124440000
MUSIC PREFERENCE : CLASSICAL, LIGHT ROCK
NEWS PREFERENCE : HEADLINE NEWS
GAME PREFERENCE : GROUP, TRIVIA
AGE : 30
SEX : F
EDUCATION : COLLEGE
OCCUPATION : ADVERTISING
SPECIAL NEED : NONE
GEOGRAPHICAL REGION : 12
MONTHLY WAIT HISTORY :
      30 MINS CLASSICAL MUSIC, SONGS A-G
      20 MINS HEADLINE NEWS, CNN
      40 MINS TRIVIA GAME, QUESTIONS 1-40 FROM GAMES R US
      50 MINS SURVEY, POLITICAL VIEWS ON SPORTS
      5 MINS LIGHT ROCK MUSIC
      10 MINS SPORTS NEWS
PRODUCTS:
      COMPUTER A
      APPLIANCE B
      CABLE SERVICE C
CURRENT WAIT HISTORY
      20 MINS QUEUE 1    -> TRANSFER TO QUEUE 3 - QUEUE 1 WRONG
      2 MINS QUEUE 3     CURRENTLY ON HOLD    ON HOLD PTS : 10

CALLER 5125550000
MUSIC PREFERENCE : JAZZ
NEWS PREFERENCE : ENTERTAINMENT NEWS
GAME PREFERENCE : CARD GAMES
AGE : 40
SEX : M
EDUCATION : GRADUATE
OCCUPATION : LEGAL
SPECIAL NEED : PARTIALLY DEAF
GEOGRAPHICAL REGION : 10
MONTHLY WAIT HISTORY :
      10 MINS ENTERTAINMENT NEWS, ET
      20 MINS JAZZ, SONGS A-C
      40 MINS JAZZ, SONGS D-G
      5 MINS JAZZ, SONG H
      40 MINS 3RD PARTY CALL
      10 MINS 3RD PARTY CALL
PRODUCTS:
      BLOCKED BY CALLER
CURRENT WAIT HISTORY
      10 MINS QUEUE 2    -> TRANSFER TO QUEUE 4 FOR ADDITIONAL QUESTION
      5 MINS QUEUE 4     CURRENTLY ON HOLD    ON HOLD PTS : 10
```

FIG. 4

MANAGING CALLER PROFILES ACROSS MULTIPLE CALL HOLD CENTERS

BACKGROUND OF THE INVENTION

1. Technical Field:

The present invention relates in general to telecommunications and, in particular, to call hold centers. Still more particularly, the present invention relates to managing a caller profile across multiple call hold centers.

(1) U.S. patent application Ser. No. 10/005,680;

(2) U.S. patent application Ser. No. 10/006,004;

(3) U.S. patent application Ser. No. 10/004,664; and (4) U.S. patent application Ser. No. 10/005,828.

2. Description of the Related Art:

Many companies provide telephone-based access to help staff, sales personnel, representatives, and automated menus via a call center. Where high telephone call traffic is typical in telephone access to a company's representatives, a PBX system receives the call and distributes the call to an automatic call distributor (ACD), thus incorporating a hold function in the call center. ACDs are often employed to provide an even and systematic distribution of incoming calls to multiple representatives. In particular, ACDs typically provide incoming calls with a direct connection to an available representative until all representatives are busy. Then, calling parties are placed in a call queue, and selectively connected to a representative once a representative comes available.

Call queues may cause frustration and ill will of consumers towards a company, particularly where excessively long waits, full queues and accidental disconnects are encountered. One way to alleviate some of the frustration associated with call queues is by specifying services and information provided to the caller while a caller waits in a call queue.

For example, services may be specified to a caller by specifying automated messages output to a caller, while the caller is on hold in a call hold queue, according to the products owned by a caller, the caller's expertise, and messages that have been previously played to the caller while on hold. In particular, a database local to the call hold queue may store information about each caller, including the products owned by each caller, each caller's expertise and previous call content with the caller.

In another example, a caller may designate service preferences to a call center via a web page. The service preferences are then utilized by the call center while the caller is on hold to specify a menu of services provided to the caller while on hold.

However, the examples previously described provide for specifying output to a caller while the caller is on hold, the examples are limited in that each individual call center stores an individual profile, requiring a caller to enter a new profile at each call center. Requiring a new profile entry at each call center is time consuming and cancels the advantages of specified output. In addition, a caller may only call a call center one time, storing a profile there, and never calling again to take advantage of the logged profile, thus wasting resources and time.

Services that may be provided to a caller while waiting include news, music, weather, and other audio information. A call hold center receiving a call may allow a caller to select a general service, such as music and then a sub-service, such as the type of music. The call hold center then transfers the call to a third-party provider of the service. Multiple call centers may utilize a single third-party provider for services. However, where multiple call centers utilize the same third-party music provider, a caller may end up hearing the same song or group of songs each time the caller is placed on hold.

Therefore, in view of the foregoing, it would be advantageous to provide a method, system, and program for storing and managing caller profiles at a single remote caller profile server that distributes the caller profiles to multiple call centers where callers are on hold. In addition, in view of the foregoing, it would be advantageous to monitor and record caller activity while callers are on hold, such that future services may be tailored to avoid repetition of past services across multiple call centers and to further tailor services according to previous activity while on hold.

SUMMARY OF THE INVENTION

In view of the foregoing, it is therefore an object of the present invention to provide an improved telecommunications system.

It is another object of the present invention to provide a method, system and program for improved call hold queues.

It is yet another object of the present invention to provide a method, system and program for managing a caller profile across multiple call hold centers.

According to one aspect of the present invention, a request for a profile of a particular caller is received from a first call hold system at a remote profile system, wherein said particular caller is on hold at the first call hold system. The profile is transferred from the remote profile system to the first call hold system. Then, another request for a profile of the same particular caller is received at the remote profile system from a second call hold system, wherein the same particular caller is on hold at the second call hold system. The profile is transferred from the remote profile system to the second call hold system. Preferably, both call hold systems are enabled to utilize the profile to specify services offered to the caller while the caller is on hold at the call hold system.

According to yet another aspect of the present invention, an identifier is detected for a received call. A request is transferred to a remote profile server for a caller profile associated with the identifier, wherein the remote profile server is enabled to supply the caller profile for the identifier to multiple independent call centers. In response to receiving the caller profile associated with the identifier, services available for a caller of the received call are specified according to the caller profile while the received call is placed on hold.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 illustrates a representative portion of a caller profile database within a caller profile server is provided in accordance with the method, system, and program of the present invention;

DETAILED DESCRIPTION OF THE PREFERRED EMBODIMENT

A method, system, and program for managing a caller profile for multiple callers across multiple call hold centers are provided. For purposes of the present invention, a caller profile includes, but is not limited to, a caller ID, personal information about a user, products and services purchased by a user, information service preferences of a user, competition services of a user, survey preferences of a user, and activity performed by a user while on hold across multiple call centers. According to the present invention, it is advantageous that a caller profile be tailored to information that aids specification of on hold activities, however a caller profile may incorporate information utilized for multiple purposes, in addition to specification of on hold activities.

For purposes of the present invention, a call center may be accessed via multiple networks including, but not limited to, wireline, wireless, Internet Protocol (IP) and PSTN networks. In addition, a call center may incorporate multiple elements including, but not limited to, a private exchange switching (PBX) systems, automatic call distribution (ACD) systems, on hold systems, voice browsers, interactive voice response units (IVRU), and other systems which typically control a call center.

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

The present invention may be executed in a variety of systems, including a variety of computing systems and electronic devices under a number of different operating systems. In one embodiment of the present invention, the on hold call queue system is a computer system that incorporates communication features that provide telephony, messaging, and information services to a plurality of callers. In general, the present invention is preferably executed in a computer system that performs computing tasks such as manipulating data in storage that is accessible to the computer system.

Figure 1:
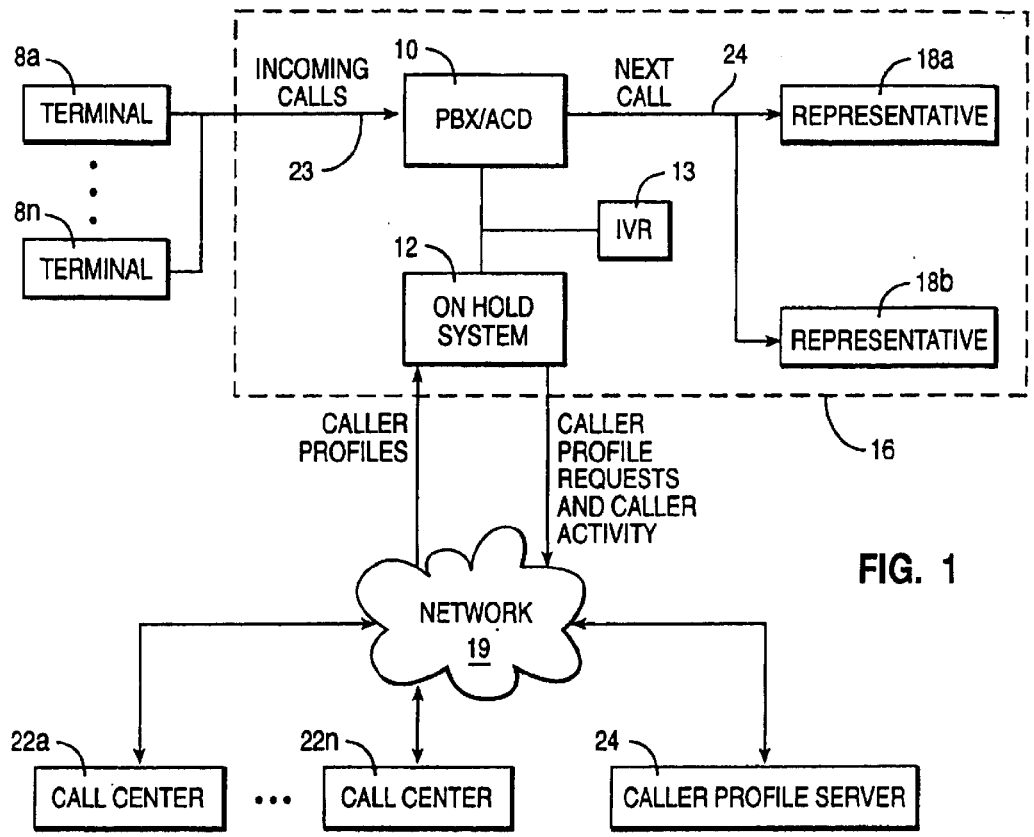
FIG. 1 depicts a block diagram of a network call or contact center system in which the present invention may be implemented.

With reference now to the figures, and, in particular, with reference now to FIG. 1, there is an illustrative network call or contact center environment in which the present invention may be implemented. It will be appreciated by one with skill in the art that although a particular network environment is described below, the invention is not limited to use within the described network environment, rather, the inventive queue position advancement process may be implemented within any on-hold information service regardless of the telephony environment.

As illustrated, multiple incoming calls are received at a call center 16. In particular, a private branch exchange switch PBX 10 with automatic call distribution (ACD) ability receives incoming calls via truck 23, where trunk 23 is connected to a network of wireline, wireless, Internet Protocol (IP), and PSTN connections. In particular, PBX systems are well known in the art as switching systems designed to received telephone calls destined for call center 16 and to queue those call when a call handling agent is not available.

PBX 10 distributes incoming calls to multiple representative terminals 18a–18n via trunk 24. In particular, PBX 10 receives incoming calls via trunk 23 from multiple terminals 8a–8n, wherein terminals 8a–8n may represent, but are not limited to, conventional wireline telephone systems, wireless phones, video phones, personal computers, pervasive computing devices configured with appropriate telephony software and Internet connectivity, telephone stations, other PBXs, or switching systems.

In the description which follows, it will be assumed that all representative terminals 18a–18n are busy and therefore PBX 10 cannot respond to an incoming call by making a direct connection to one of representative terminals 18a–18n. As a result, PBX 10 is forced to place the incoming call on hold. In addition, PBX 10 determines the calling telephone number from caller ID or other methods.

After placing the incoming call on hold, the call and caller ID, time of call, and other information obtained by PBX 10 are forwarded to on hold system 12. On hold system 12 preferably creates a record based on the call and positions the call within a call queue. While in the present embodiment PBX 10 forwards calls to a single on hold system, in alternate embodiments, PBX 10 may forward calls to multiple on hold systems. In addition, on hold system 12 and other on hold systems may be coupled to PBX 10 or may be remotely accessed by PBX 10. Further, while in the present embodiment on hold system 12 is depicted as an independent system, on hold system 12 may also be incorporated within PBX 10.

While the call is on hold, an interactive voice response unit (IVRU) 13, coupled to PBX 10 and on hold system 12, may offer the caller a menu of available options for receiving call hold queue information for on hold system 12. In general, IVRU 13 is a voice information system which may be arranged to (i) prompt a caller for specific information by asking questions based on a set of modules in a transactions script, (ii) collect that information by detecting and interpreting dual tone multifrequency (DTMF) signals entered by the caller or by recognized speech input by the caller, (iii) organize the collected information in a specific format and (iv) forward the collected information to be utilized within ACD 12. For purposes of the present invention, prompts to the caller may be in voice, text, video, and/or graphical formats depending on the interface receiving the prompt.

According to one advantage of the present invention, a caller profile may be accessed by on hold system 12 from a caller profile server 24, via a network 19. On hold system 12 may then use the caller profile to specify the menu of available options and other services provided to the caller while on hold.

Caller profile server 24 preferably includes profiles for multiple callers that are accessible across multiple call centers including, but not limited to call center 16 and call centers 22a–22n. According to one advantage of the present invention, a caller profile may be initiated and adjusted both on-line and off. In particular, a profile for a caller may be initiated and added to from any subscribing call center on-line. In addition, a profile for a caller may be initiated and adjusted by the caller via a web site interface to caller profile server 24 off-line.

Figure 2:
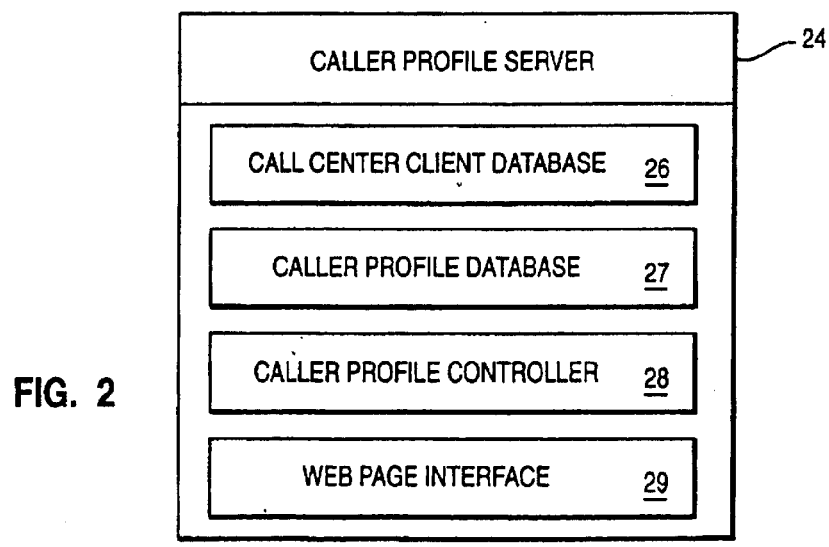
FIG. 2 illustrates a block diagram of a caller profile server in accordance with the method, system, and program of the present invention.

Referring now to FIG. 2, there is an illustrative block diagram of a caller profile server in accordance with the method, system, and program of the present invention. As depicted, a caller profile server 24 includes a caller profile controller 28 for controlling the functions of caller profile server 24. In particular, caller profile controller 30 may include at least one processor, memory, data storage, system software, and application software that function together.

Caller profile server 24 also includes a call center client database 26. Advantageously, call centers may be required to subscribe to use of call profile server 24. In subscribing to use of call profile server 24, a call center may specify the types of information from a caller profile that are transmitted in response to a request from that call center for a caller profile. Preferably, registered call centers may be stored in call center client database 26 with a call center identifier, call profile specifications, and other information about each call center. Further, registered call centers may be required to sign a privacy statement that is filed with the call center identifier, to ensure that personal caller information is only utilized privately by the registered call centers.

In addition, caller profile server 24 includes a caller profile database 27. Caller profile database 27 preferably includes multiple caller profiles stored according to caller ID. Caller profiles may include personal information, service preferences, product and service purchase records, previous hold activities, current wait history, and other information that is provided by a caller or monitored by a call center and transferred to call profile server 24. In addition, a caller profile may include preferences for types of token advancement systems and records of extra tokens earned by the caller for redemption in future calls, where token advancement systems and extra tokens are described in U.S. patent application Ser. No. __/_____ (Attorney Docket No. AUS920010947US1). Further, a caller profile may include preferences for the interface and format of publication of hold queue information, where such publication is described in U.S. patent application Ser. No. __/_____ (Attorney Docket No. AUS920010945US1).

Further, a web page interface 29 preferably includes a web infrastructure for providing callers with access to a web page for initiation and adjustment of a caller profile. In particular, information entered by the caller via the web page is utilized to initiate or adjust a caller profile. Further, in particular, the web infrastructure may be accessed at least via a web browser or a voice browser.

Figure 3:
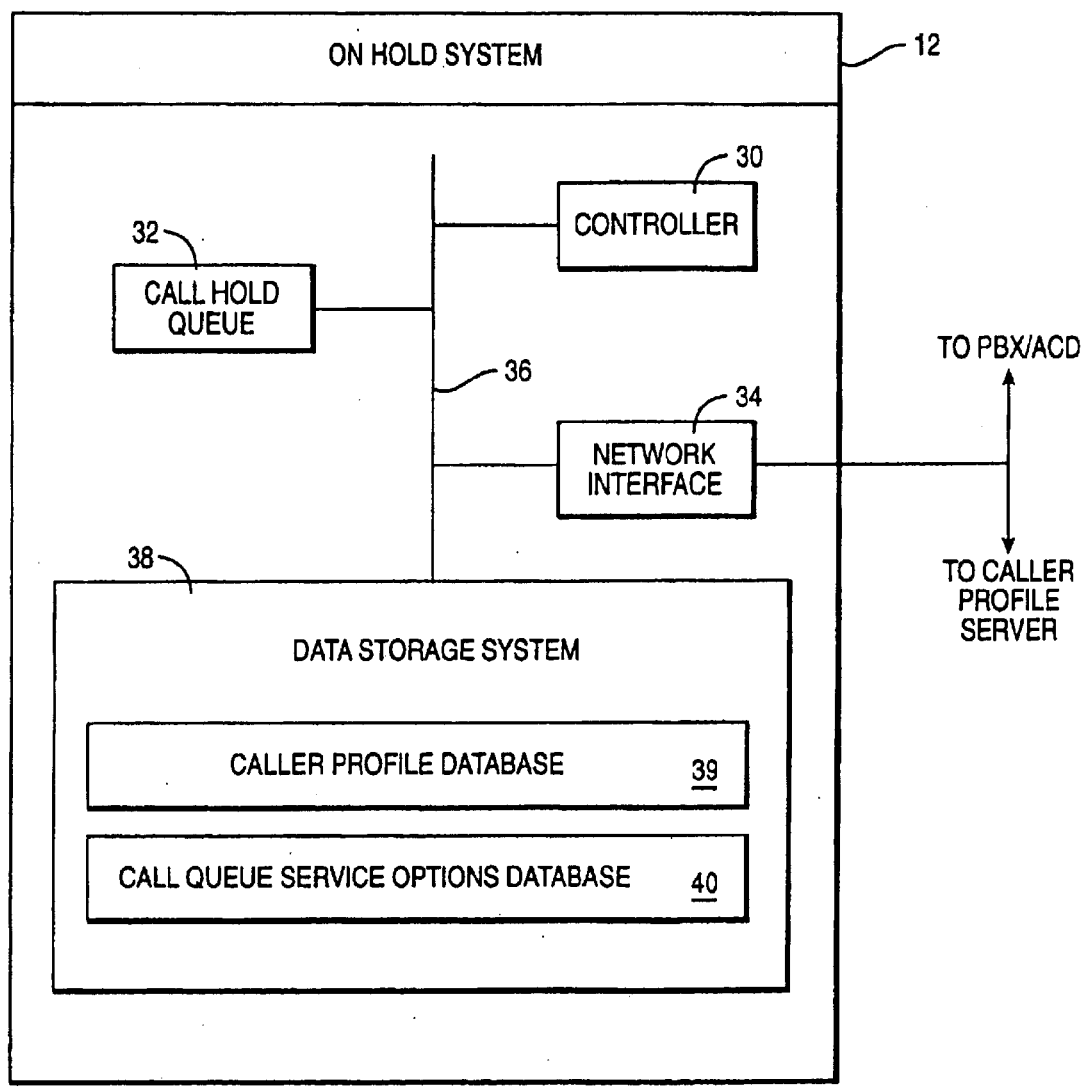
FIG. 3 depicts a block diagram of an on hold system in accordance with the method, system, and program of the present invention.

With reference now to FIG. 3, there is an illustrative block diagram of an on hold system in accordance with the method, system, and program of the present invention. As illustrated, on hold system 12 includes a controller 30, a call hold queue 32, a network interface 34, and a data storage system 38 communicatively connected via a bus 36. Additional systems may be connected along bus 36 that are not depicted herein. In particular, controller 30 comprises conventional computer resources including, but are not limited to, at least one processor, memory, a data storage system, system software and application software, that function together to perform the functions described with reference to controller 30.

Network interface 34 preferably communicates with PBX 10 and caller profile server 24 via a telephone network or other networking system. In particular, network interface 34 receives transfers of calls from PBX 10 and then returns calls to PBX 10 when a call is the next in line within call hold queue 32.

In the present invention, while a call is holding within call hold queue 32, the caller is preferably prompted by IVRU 13 to select from the multiple available service options designated in call queue service options database 40. However, according to an advantage of the present invention, the service options are first filtered according to the caller profile associated with the caller ID of the call, such that the caller is only presented with those options that are specifically designated by the caller and those options which are tailored to the caller according to the caller profile.

A caller profile may be stored locally to on hold system 12 in caller profile database 39. In addition, according to an advantage of the present invention, a caller profile may be accessed remotely from caller profile server 24.

To access the caller profile for a caller ID from caller profile server 24, the caller ID of a call and a request for a caller profile are preferably transmitted via network interface 34 to caller profile server 24. Caller profile server 24 then responds with a caller profile or with an indicator that a caller profile is unavailable. In particular, the call profile returned to on hold system 12 is preferably tailored with the types of information subscribed to by on hold system 12.

Caller profiles returned from caller profile server 24 may be stored in caller profile database 39 to supplement or start a caller profile for a particular caller ID. In particular, it may be advantageous for on hold system 12 to manage a local caller profile for a caller ID, in addition to accessing the caller profile from caller profile server 24, where the caller profile include purchases made by the caller and other information that the caller has specifically disclosed to the on hold system in privacy. In addition, a local caller profile stored in caller profile database 39 advantageously includes a record of current wait history within on hold system 12, where points are tabulated when callers wait in more than one hold queue.

After a caller selects a service option, the activity of the caller while on hold is preferably monitored by on hold system 12. In particular, the on hold system may monitor the types of music, news or other audio information listened to, the competitions participated in, the third-parties accessed, and other activities that a caller may participate in while on hold. The monitored activity may be added to the local caller profile in caller profile database 39. In addition, according to an advantage of the present invention, the monitored activity is transmitted to caller profile server 24. Where the call is transferred to a third-party system that performs the selected service option, that third-party system may monitor activity and notify on hold system 12 and caller profile server 24 of the monitored activity.

In addition, after a caller selects a service option, the service is specified according to a caller profile. In particular, where a caller selects a music service, the music service is specified not to play songs that the caller has already listened to within a particular period of time as indicated within the caller profile. In addition, the caller profile may indicate specific songs that the caller prefers to hear.

In particular, while the present embodiment depicts a single call hold queue 32 within on hold system 12, multiple call hold queues may be managed within on hold system 12. Where multiple call hold queues are managed, a specific set of representatives from among all the representatives may answer calls for each of the multiple call hold queues. Alternatively, a single call center may include multiple on hold systems where each on hold system includes a call hold queue that holds calls intended for a specific set of representatives from among all the representatives. In either case, callers may select a subject that places the caller in a specific queue. However, the caller may select the wrong queue and need to be transferred to another queue by a first representative answering the call. Also, the caller may have multiple questions or a question which requires the skills of multiple representatives to be fully answered, such that the caller is transferred from a first representative to a queue to wait for a second representative.

According to an advantage of the present invention, a caller profile stored locally or remotely may include the current call hold history of a caller. Where a caller is transferred from one queue to another queue, the caller is preferably adjusted in position within the queue according wait times that have already occurred during the call. Thus, if a caller has already waited 40 minutes in a first queue only to find out that the caller selected the wrong queue, then some portion of the first hold time is utilized to adjust the position of the caller in the second queue, such that the caller does not lose all the time originally waited when positioned in the second queue.

In particular, the caller profile is utilized to calculated on hold points that are utilized to determine the adjustment in queue. Different systems may provide different amounts of adjustment depending on the reason for holding or transferring. For example, a caller who has waited in the wrong queue may not be given as many points for minutes previously on hold as a caller is given who has waited for a first representative and an additional representative is required to fully answer a question.

With reference now to FIG. 4, an illustrative portion of a caller profile database within a caller profile server is provided in accordance with the method, system, and program of the present invention. As depicted, caller profiles 50 include two caller profiles stored according to caller ID.

First, preferences for each caller are specified, in the present example, according to music, news, and games. In alternate embodiments, alternate types of preferences may be specified. In addition, while in the present embodiment generic preferences are specified, in alternate embodiments, more specific preferences, such as weather in a particular zip code, a particular song, a particular game, and other such specifications, may be made.

Next, personal information for each caller is specified. In the example, personal information includes the sex, age, education, occupation, and typical geographic region of the caller. Personal information may be utilized by an on hold system to tailor the services provided to a caller. For example, instead of just offering a current weather service, a current weather service for the caller's geographical region may be offered. Further, advertising played to the caller may be better targeted according to the age, sex, occupation, education, and special needs of a caller.

In addition, a monthly wait history preferably indicates the activity of a caller according to time, service, and specific activity within the service. For example, caller ID "5124440000" spent thirty minutes on hold listening to classical music. In particular, songs A–G were played, where the titles or reference numbers of songs A–G are provided. In addition, the call system ID may be included with each entry of a monthly wait history.

Further, products and services purchased by a caller are specified. For example, the computer, appliance or cable service utilized by a caller may be recorded. The caller may specify products and services for a caller profile or companies may share product and service information in caller profiles.

Moreover, a current wait history for each call is included in a caller profile. The amount of time, the queue in which a caller waits and the reason for transferring to another queue are recorded in a caller profile. In addition, on hold points may be calculated for a caller based on the number of minutes on hold and the reason for transferring. Alternatively, each on hold system may calculate on hold points based on number of minutes on hold and the reason for transferring.

Each on hold system may adjust the position of a call in a queue that the call has been transferred to according to the on hold points from a caller profile for the call. Therefore, a caller does not lose the time already on hold when transferring to another call hold queue is required.

Figure 5:
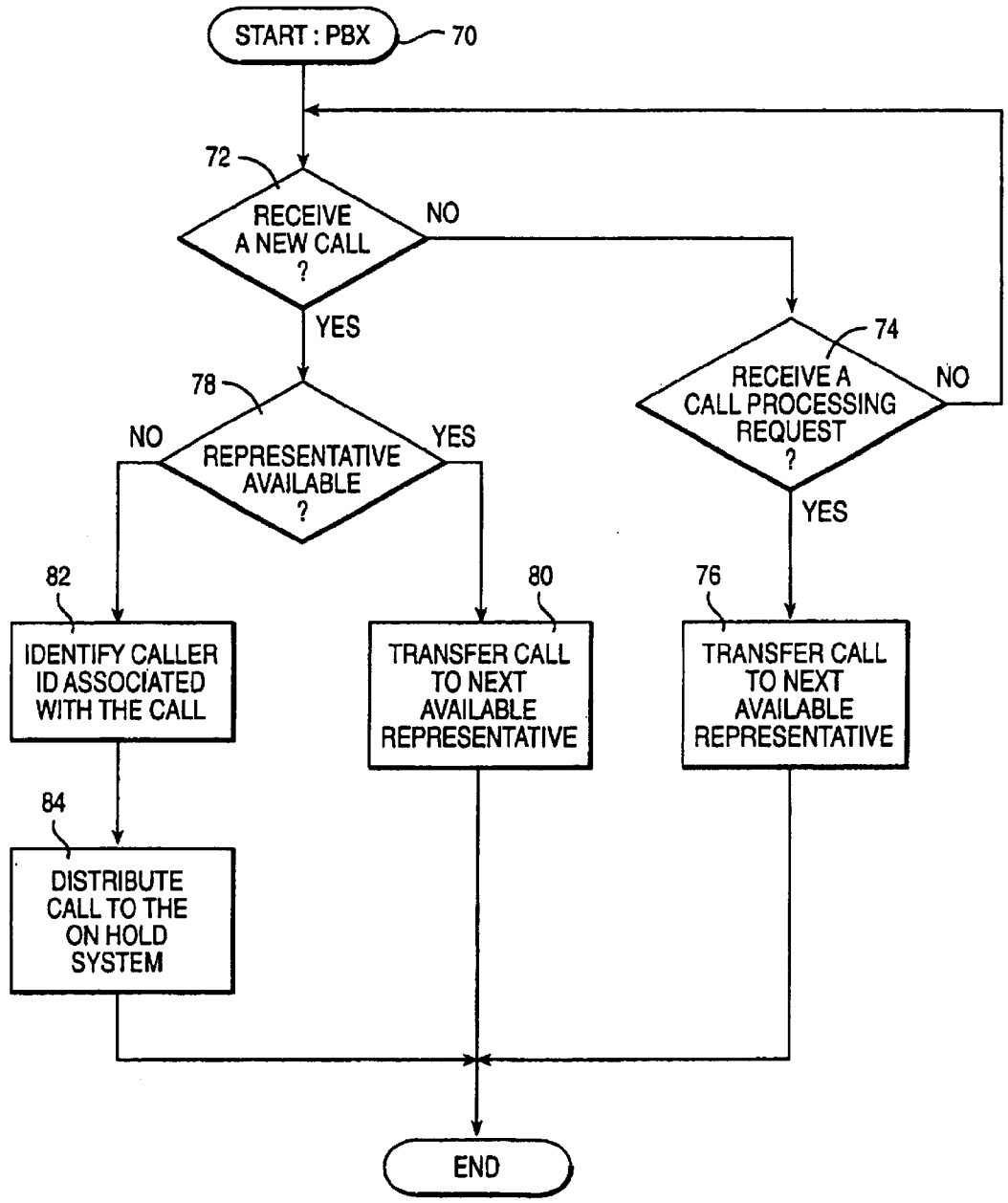
FIG. 5 depicts a high level logic flowchart of a process and program for controlling a PBX system within a call center in accordance with the method, system, and program of the present invention.

Referring now to FIG. 5, there is depicted a high level logic flowchart of a process and program for controlling a PBX system within a call center in accordance with the method, system, and program of the present invention. As illustrated, the process starts at block 70 and thereafter proceeds to block 72.

Block 72 depicts a determination as to whether a new call is received. If a new call is received, then the process passes to block 78. If a new call is not received, then the process passes to block 74. Block 74 illustrates a determination as to whether or not a call processing request is received. When a call is at the top of the call queue, the call is preferably transferred back to the PBX with a call processing request. If a call processing request is not received, then the process passes to block 72. If a call process request is received, then the call is transferred to the next available representative, as depicted at block 74, and the process ends.

Block 78 illustrates a determination as to whether or not a representative is available. If a representative is available, then the call is transferred to the next available representative, as illustrated at block 80, and the process ends. If a representative is not available, then the process passes to block 82. Block 82 depicts identifying the caller ID associated with the call. Next, block 84 illustrates distributing the call to the on hold system, and the process ends.

Figure 6:
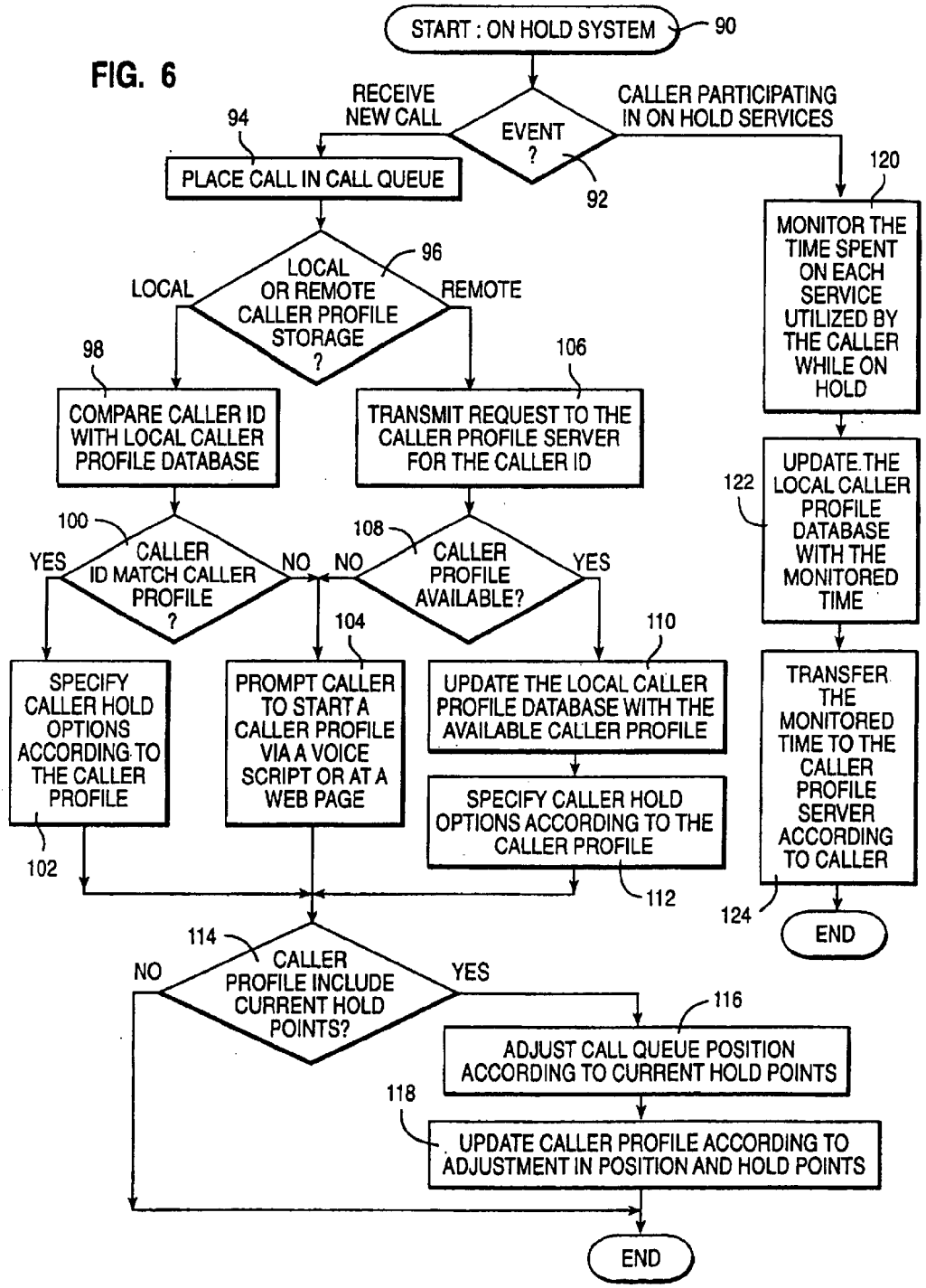
FIG. 6 illustrates a high level logic flowchart of a process and program for controlling an on hold system in accordance with the method, system, and program of the present invention.

With reference now to FIG. 6, there is illustrated a high level logic flowchart of a process and program for controlling an on hold system in accordance with the method, system, and program of the present invention. As depicted, the process starts at block 90 and thereafter proceeds to block 92.

Block 92 illustrates a determination as to the type of event that occurred when an event occurs. If a new call is received, then the process passes to block 94. If a caller participates in on hold services, then the process passes to block 120. If a caller profile is received, then the process passes to block 130.

Block 94 depicts placing the call in a call queue. Next, block 96 illustrates a determination as to whether local and/or remote caller profile storage is utilized. Both local and remote caller profile storage maybe utilized concurrently. If local caller profile storage is utilized, then the process passes to block 98. If remote caller profile storage is utilized, then the process passes to block 106.

Block 98 illustrates comparing the caller ID of the call with the local caller profile database. Next, block 100 depicts a determination of whether a caller ID matches a caller profile.

If a caller ID does not match a caller profile, then the caller is prompted to start a caller profile via a voice script or at a web page, as illustrated at block 104, and the process passes to block 114. In particular, regardless of whether a caller starts a profile, profile building for a caller ID may begin for the current call.

If a caller ID does match a caller profile, then the process passes to block 102. Block 102 depicts specifying the caller hold options according to the caller profile, and the process passes to block 114.

Block 106 depicts transmitting the request to the caller profile service for a caller profile according to the current caller ID. Next, block 108 illustrates a determination as to whether or not a caller profile is available from the caller profile server. If a caller profile is not available, then the process passes to block 104. If a caller profile is available, then the process passes to block 110.

Block 110 illustrates updating the local caller profile database with the available caller profile. Next, block 112 depicts specifying the caller hold options according to the caller profile, and the process passes to block 114.

Block 114 depicts a determination as to whether a caller profile includes current hold points or multiple holds during the current call. If a caller profile does not include current hold points or multiple holds during the current call, then the process ends. If a caller profile does include current hold points or multiple holds during the current call, then the process passes to block 116. Block 116 illustrates adjusting the call queue position of the call according to the current hold points or multiple holds during the current call. Each on hold system may make a particular number of adjustments in position of a caller dependent upon the on hold systems needs. Next, block 118 depicts updating the caller profile according to the adjustment in position and hold point usage, and the process ends.

In response to detecting a caller participating in on hold services, block 120 depicts monitoring the time spent on each service utilized by the caller while on hold. Next, block 122 illustrates updating the local caller profile database with the monitored times. Thereafter, block 124 depicts transferring the monitored times to the caller profile service according to the caller ID, and the process ends.

Figure 7:
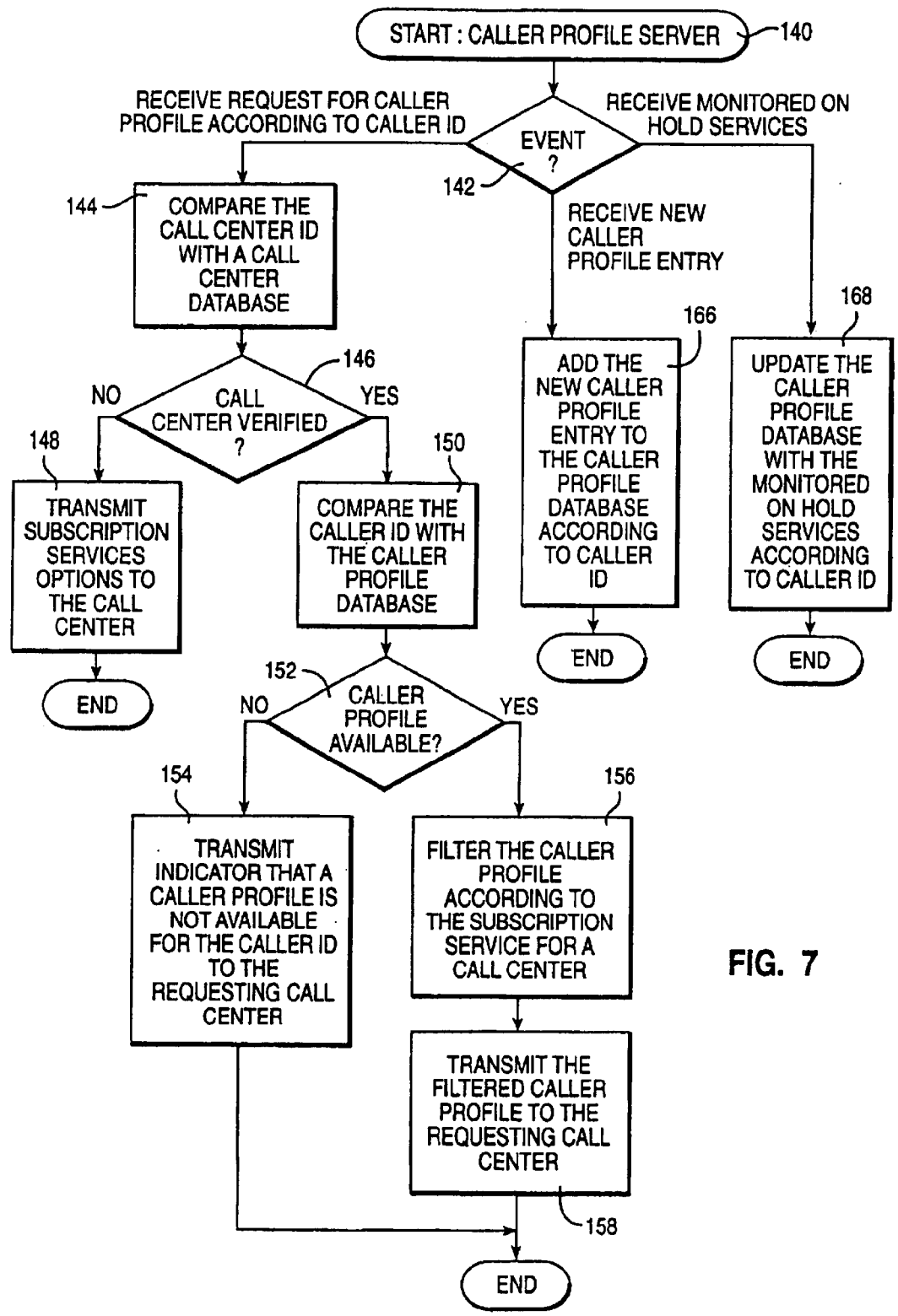
FIG. 7 depicts a high level logic flowchart of a process and program for controlling a caller profile server in accordance with the method, system, and program of the present invention.

Referring now to FIG. 7, there is illustrated a high level logic flowchart of a process and program for controlling a caller profile server in accordance with the method, system, and program of the present invention. As depicted, the process starts at block 140 and thereafter proceeds to block 142.

Block 142 illustrates a determination as to the type of event that occurred when an event occurs. If a request for a caller profile according to caller ID is received, then the process passes to block 144. If a new caller profile entry is received, then the process passes to block 166. If monitored on hold service activity is received, then the process passes to block 168.

Block 144 depicts comparing the call center ID with the call center database. Next, block 146 illustrates a determination as to whether the call center is verified. If the call center is not verified, then a subscription services option is transmitted to the caller center, as depicted at block 148, and the process ends. If the call center is verified, then the process passes to block 150.

Block 150 illustrates comparing the caller ID with the caller profile database. Next, block 152 depicts a determination as to whether a caller profile is available for the caller ID. If a caller profile is not available for the caller ID, then an indicator is transmitted to the call center indicating that the caller profile is not available, as illustrated at block 154, and the process ends. If a caller profile is available, then the process passes to block 156.

Block 156 depicts filtering the caller profile according to the subscription service for the call center. Next, block 158 illustrates transmitting the filtered caller profile to the requesting call center, and the process ends.

In response to receiving a new caller profile entry, block 166 illustrates adding the new caller profile entry to the caller profile database according to a caller ID, and the process ends.

In particular, a new caller profile may be received from a call center, received via a web page entry, or received via a voice entry.

In response to receiving monitored on hold service activity, block 168 depicts updating the caller profile database with the monitored on hold service activity according to caller ID. In particular, the monitored on hold service activity may include the monitored times, general services, and activity within the service.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

While the invention has been particularly shown and described with reference to a preferred embodiment, it will be understood by those skilled in the art that various changes in form and detail may be made therein without departing from the spirit and scope of the invention.

What is claimed is:

1. A method for distributing caller profiles comprising:
   receiving a plurality of requests at a central server system for a plurality of caller profiles corresponding to a plurality of callers currently on hold within a plurality of call centers; and
   distributing said plurality of caller profiles corresponding to said plurality of callers across said plurality of call centers, wherein said plurality of caller profiles enable said plurality of call centers to customize on-hold services provided to each of said plurality of callers currently on hold based on prior on-hold activity recorded in each of said plurality of caller profiles.

2. The method for distributing caller profiles according to claim 1, wherein distributing said plurality of caller profiles further comprises:
   only distributing said plurality of caller profiles to a registered selection of said plurality of call centers.

3. The method for distributing caller profiles according to claim 1, wherein distributing said plurality of caller profiles further comprises:

filtering each of said plurality of caller profiles for each of said plurality of call centers according to profile information preferences of each of said call centers.

4. The method for distributing caller profiles according to claim 1, wherein said plurality of requests each comprise an identifier for said call center and an identifier for a particular caller.

5. The method for distributing caller profiles according to claim 1, further comprising:

receiving specifications for a particular caller profile from among said plurality of caller profiles via a web page interface.

6. The method for distributing caller profiles according to claim 1, further comprising:

receiving specifications for a particular caller profile from at least one from among said plurality of call centers.

7. The method for distributing caller profiles according to claim 1, wherein each of said plurality of caller profiles comprises at least one from among a caller identifier, personal information, a selection of preferences, previous activity while on hold, and product purchases.

8. A system for distributing caller profiles comprising:

a central server system for receiving a plurality of requests for a plurality of caller profiles corresponding to a plurality of callers currently on hold within a plurality of call centers; and means for distributing said plurality of caller profiles corresponding to said plurality of callers across said plurality of call centers, wherein said plurality of caller profiles enable said plurality of call centers to customize on-hold services provided to each of said plurality of callers currently on hold based on prior on-hold activity recorded in each of said plurality of caller profiles.

9. The system for distributing caller profiles according to claim 8, wherein said means for distributing said plurality of caller profiles further comprises:

means for only distributing said plurality of caller profiles to a registered selection of said plurality of call centers.

10. The system for distributing caller profiles according to claim 8, wherein said means for distributing said plurality of caller profiles further comprises:

means for filtering each of said plurality of caller profiles for each of said plurality of call centers according to profile information preferences of each of said call centers.

11. The system for distributing caller profiles according to claim 8, wherein said plurality of requests each comprise an identifier for said call center and an identifier for a particular caller.

12. The system for distributing caller profiles according to claim 8, further comprising:

means for receiving specifications for a particular caller profile from among said plurality of caller profiles via a web page interface.

13. The system for distributing caller profiles according to claim 8, further comprising:

means for receiving specifications for a particular caller profile from at least one from among said plurality of call centers.

14. The system for distributing caller profiles according to claim 8, wherein each of said plurality of caller profiles comprises at least one from among a caller identifier, personal information, a selection of preferences, previous activity while on hold, and product purchases.

15. A computer program product for managing a hold queue at a call center, said computer program product comprising:

a recording medium;

means, recorded on said recording medium, for receiving a plurality of requests for a plurality of caller profiles corresponding to a plurality of callers currently on hold within a plurality of call centers; and means, recorded on said recording medium, for distributing said plurality of caller profiles corresponding to said plurality of callers across said plurality of call centers, wherein said plurality of caller profiles enable said plurality of call centers to customize on-hold services provided to each of said plurality of callers currently on hold based on prior on-hold activity recorded in each of said plurality of caller profiles.

16. The computer program product for distributing caller profiles according to claim 15, wherein said means for distributing said plurality of caller profiles further comprises:

means, recorded on said recording medium, for only distributing said plurality of caller profiles to a registered selection of said plurality of call centers.

17. The computer program product for distributing caller profiles according to claim 15, wherein said means for distributing said plurality of caller profiles further comprises:

means, recorded on said recording medium, for filtering each of said plurality of caller profiles for each of said plurality of call centers according to profile information preferences of each of said call centers.

18. The computer program product for distributing caller profiles according to claim 15, further comprising:

means, recorded on said recording medium, for receiving specifications for a particular caller profile from among said plurality of caller profiles via a web page interface.

19. The computer program product for distributing caller profiles according to claim 15, further comprising:

means, recorded on said recording medium, for receiving specifications for a particular caller profile from at least one from among said plurality of call centers.

20. A method for managing a caller's hold queue profile comprising:

receiving a request for a profile of a particular caller from a first call hold system, wherein said particular caller is on hold at said first call hold system, transferring said profile of said particular caller to said first call hold system;

receiving a record of on-hold activity by said particular caller from said first call hold system;

updating said profile of said particular caller with said record of on-hold activity;

receiving a next request for a profile of said particular caller from a second call hold system, wherein said particular caller is on hold at said second call hold system; and transferring said profile of said particular caller to said second call hold system, wherein said second call hold system is enabled to specify on-hold services provided to said particular caller based on said profile.

21. A system for managing a caller's hold queue profile comprising:

a central server system for managing a plurality of caller profiles;

means for receiving a request for a profile of a particular caller from a first call hold system, wherein said particular caller is on hold at said first call hold system;

means for transferring said profile of said particular caller to said first call hold system;

means for receiving a record of on-hold activity by said particular caller from said first call hold system;

means for updating said profile of said particular caller with said record of on-hold activity;

means for receiving a next request for a profile of said particular caller from a second call hold system, wherein said particular caller is on hold at said second call hold system; and means for transferring said profile of said particular caller to said second call hold system, wherein said second call hold system is enabled to specify on-hold services provided to said particular caller based on said profile.

22. A computer program product for managing a caller's hold queue profile, said computer program product comprising:

a recording medium;

means, recorded on said recording medium, for receiving a request for a profile of a particular caller from a first call hold system, wherein said particular caller is on hold at said first call hold system;

means, recorded on said recording medium, for transferring said profile of said particular caller to said first call hold system;

means, recorded on said recording medium, for receiving a record of on-hold activity by said particular caller from said first call hold system;

means, recorded on said recording medium, for updating said profile of said particular caller with said record of on-hold activity;

means, recorded on said recording medium, for receiving a next request for a profile of said particular caller from a second call hold system, wherein said particular caller is on hold at said second call hold system; and means recorded on said recording medium, for transferring said profile of said particular caller to said second call hold system, wherein said second call hold system is enabled to specify on-hold services provided to said particular caller based on said profile.

23. A method for specifying on hold services comprising:

detecting an identifier for a received call;

transferring a request to a remote profile server for a caller profile associated with said identifier, wherein said remote profile server is enabled to supply said caller profile for said identifier to a plurality of independent call centers; and responsive to receiving said caller profile associated with said identifier, specifying on-hold services based on prior on-hold activity recorded in said caller profile available for a caller of said received call while said received call is placed on hold.

24. The method for specifying on hold services according to claim 23, further comprising:

comparing said identifier with a local caller profile database; and responsive to detecting a local caller profile associated with said identifier, specifying services available for said caller of said received call according to said local caller profile and said caller profile received from said remote profile server.

25. The method for specifying on hold services according to claim 23, wherein specifying services available for a caller further comprises:

specifying a selection of general on-hold services from among a plurality of general on-hold services available according to said caller profile.

26. The method for specifying on hold services according to claim 23, wherein specifying services available for a caller further comprises:

receiving a selection of a music service by said caller; and specifying musical selections for said caller according to specific music preferences and previously heard musical selections as designated by said caller profile.

27. The method for specifying on hold services according to claim 23, further comprising:

monitoring a plurality of on-hold activities performed by said caller within said plurality of on-hold services; and transmitting said plurality of on-hold activities to said remote profile server, such that said remote profile server is enabled to manage said caller profile across said plurality of independent call centers.

28. The method for specifying on hold services according to claim 23, further comprising:

responsive to receiving said caller profile associated with said identifier, adjusting a position of said caller in a hold queue according to previous hold times for said current call identified in said caller profile.

29. A system for specifying on hold services comprising:

a communicative device for receiving a call;

means for detecting an identifier for said received call;

means for transferring a request to a remote profile server for a caller profile associated with said identifier, wherein said remote profile server is enabled to supply said caller profile for said identifier to a plurality of independent call centers; and means responsive to receiving said caller profile associated with said identifier, for specifying on-hold services based on prior on-hold activity recorded in said caller profile available for a caller of said received call while said received call is placed on hold.

30. The system for specifying on hold services according to claim 29, further comprising:

means for comparing said identifier with a local caller profile database; and means responsive to detecting a local caller profile associated with said identifier, for specifying services available for said caller of said received call according to said local caller profile and said caller profile received from said remote profile server.

31. The system for specifying on hold services according to claim 29, wherein said means for specifying services available for a caller further comprises:

means for specifying a selection of general on-hold services from among a plurality of general on-hold services available according to said caller profile.

32. The system for specifying on hold services according to claim 29, wherein said means for specifying services available for a caller further comprises:

means for receiving a selection of a music service by said caller; and means for specifying musical selections for said caller according to specific music preferences and previously heard musical selections as designated by said caller profile.

33. The system for specifying on hold services according to claim 29, further comprising:

means for monitoring a plurality of on-hold activities performed by said caller within said plurality of on-hold services; and means for transmitting said plurality of on-hold activities to said remote profile server, such that said remote profile server is enabled to manage said caller profile across said plurality of independent call centers.

34. The system for specifying on hold services according to claim 29, further comprising:

means responsive to receiving said caller profile associated with said identifier, for adjusting a position of said caller in a hold queue according to previous hold times for said current call identified in said caller profile.

35. A computer program product for specifying on hold services, said computer program product comprising:

a recording medium;

means, recorded on said recording medium, for detecting an identifier for said received call;

means, recorded on said recording medium, for transferring a request to a remote profile server for a caller profile associated with said identifier, wherein said remote profile server is enabled to supply said caller profile for said identifier to a plurality of independent call centers; and means, recorded on said recording medium, for specifying on-hold services based on prior on-hold activity recorded in said caller profile available for a caller of said received call while said received call is placed on hold.

36. The computer program product for specifying on hold services according to claim 35, further comprising:

means, recorded on said recording medium, for comparing said identifier with a local caller profile database; and means, recorded on said recording medium, for specifying services available for said caller of said received call according to a local caller profile received from said local caller profile database and said caller profile received from said remote profile server.

37. The computer program product for specifying on hold services according to claim 35, wherein said means for specifying services available for a caller further comprises:

means, recorded on said recording medium, for specifying a selection of general on-hold services from among a plurality of general on-hold services available according to said caller profile.

38. The computer program product for specifying on hold services according to claim 35, wherein said means for specifying services available for a caller further comprises:

means, recorded on said recording medium, for receiving a selection of a music service by said caller; and means, recorded on said recording medium, for specifying musical selections for said caller according to specific music preferences and previously heard musical selections as designated by said caller profile.

39. The computer program product for specifying on hold services according to claim 35, further comprising:

means, recorded on said recording medium, for monitoring a plurality of on-hold activities performed by said caller within said plurality of on-hold services; and means, recorded on said recording medium, for transmitting said plurality of on-hold activities to said remote profile server, such that said remote profile server is enabled to manage said caller profile across said plurality of independent call centers.

40. The computer program product for specifying on hold services according to claim 35, further comprising:

means, recorded on said recording medium, for adjusting a position of said caller in a hold queue according to previous hold times for said current call identified in said caller profile.

* * * * *

UNITED STATES PATENT AND TRADEMARK OFFICE
CERTIFICATE OF CORRECTION

PATENT NO.   : 6,826,276 B2
DATED        : November 30, 2004
INVENTOR(S)  : Michael Wayne Brown et al.

It is certified that error appears in the above-identified patent and that said Letters Patent is hereby corrected as shown below:

Column 1,
Starting at line 4, should read:
-- CROSS-REFERENCE TO RELATED APPLICATIONS
The present application is related to the following co-pending applications, incorporation herein by reference:
(1) U.S. patent application Ser. No. 10/005,680;
(2) U.S. patent application Ser. No. 10/006,004;
(3) U.S. patent application Ser. No. 10/004,664; and
(4) U.S. patent application Ser. No. 10/005,828. --

Column 1,
Lines 12-16, cancel the text beginning with "(1) U.S. patent application Ser. No. 10/005,680" and ending with -- (4) U.S. patent application Ser. No. 10/005,828. --.

Column 5,
Lines 44-45, cancel "__/_____ (Attorney Docket No. AUS920010947US1)" and insert -- 10/004,664 --
Lines 49-50, cancel "__/_____ (Attorney Docket No. AUS920010945US1)" and insert -- 10/005,680 --

Signed and Sealed this

Twenty-eighth Day of June, 2005

JON W. DUDAS
*Director of the United States Patent and Trademark Office*